United States Patent
Walzik et al.

(10) Patent No.: US 9,937,896 B2
(45) Date of Patent: Apr. 10, 2018

(54) MOTOR VEHICLE HAVING A LAMP IN AN ANTENNA DEVICE FOR SIGNALING THE OPERATING CONDITION OF A SECURITY SYSTEM

(71) Applicant: Bayerische Motoren Werke Aktiengesellschaft, Munich (DE)

(72) Inventors: Werner Walzik, Karlsfeld (DE); Juergen Bruegl, Munich (DE); Thomas Wuensche, Munich (DE); Max Klimke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 145 days.

(21) Appl. No.: 14/694,237

(22) Filed: Apr. 23, 2015

(65) Prior Publication Data

US 2015/0224962 A1 Aug. 13, 2015

Related U.S. Application Data

(63) Continuation of application No. PCT/EP2013/072104, filed on Oct. 23, 2013.

(30) Foreign Application Priority Data

Oct. 24, 2013 (DE) .................... 10 2012 219 404

(51) Int. Cl.
*B60R 25/10* (2013.01)
*B60R 25/20* (2013.01)
*H01Q 1/32* (2006.01)

(52) U.S. Cl.
CPC .......... *B60R 25/10* (2013.01); *B60R 25/1003* (2013.01); *B60R 25/2009* (2013.01); *H01Q 1/32* (2013.01); *B60R 2325/205* (2013.01)

(58) Field of Classification Search
CPC .............. B60R 2325/205; B60R 25/10; B60R 25/1003; B60R 25/2009; H01Q 1/32
See application file for complete search history.

(56) References Cited

U.S. PATENT DOCUMENTS 6,262,686 B1 * 7/2001 Delarminat .............. H01Q 1/06
343/703
6,646,613 B1 * 11/2003 Cheng ...................... H01Q 1/06
343/713

(Continued)

FOREIGN PATENT DOCUMENTS

DE 10158966 A1 * 6/2003 ............. B60R 25/04
DE 10 2004 041 245 A1 3/2006

(Continued)

OTHER PUBLICATIONS

German Search Report dated Jul. 23, 2013 with partial English-language translation (ten (10) pages).
International Search Report (PCT/ISA/210) dated Jan. 14, 2014 with English-language translation (four (4) pages).

*Primary Examiner* — Nay Tun
(74) *Attorney, Agent, or Firm* — Crowell & Moring LLP

(57) ABSTRACT

A motor vehicle having a security system includes a first lamp for indicating the operating state of the security system, and an antenna device which is supported by the body of the motor vehicle and is arranged outside the vehicle body. The first lamp is integrated into the antenna device.

20 Claims, 4 Drawing Sheets

(56) References Cited

U.S. PATENT DOCUMENTS

| | | | |
|---|---|---|---|
| 7,333,065 B2* | 2/2008 | Lindackers | H01Q 1/3275 343/713 |
| 7,646,351 B2* | 1/2010 | Wang | H01Q 1/3275 343/713 |
| 2005/0151396 A1* | 7/2005 | Berberich | B60R 7/04 296/214 |
| 2006/0152941 A1* | 7/2006 | Chiang | B60Q 1/2661 362/540 |
| 2009/0108989 A1* | 4/2009 | Sinclair | B60R 25/045 340/5.62 |
| 2010/0265058 A1* | 10/2010 | Aretuo | B60Q 1/2611 340/472 |
| 2012/0074841 A1 | 3/2012 | Liu et al. | |
| 2012/0161956 A1 | 6/2012 | Grundmann et al. | |
| 2012/0242466 A1 | 9/2012 | Stillfried et al. | |
| 2012/0306634 A1* | 12/2012 | Tsuda | B60Q 1/2611 340/425.5 |

FOREIGN PATENT DOCUMENTS

| | | | | |
|---|---|---|---|---|
| DE | 20 2006 009 591 U1 | 11/2006 | | |
| DE | 102007041701 A1 * | 3/2009 | | B60Q 9/00 |
| DE | 10 2007 054 742 B3 | 4/2009 | | |
| DE | 10 2010 008 343 A1 | 8/2011 | | |
| DE | 10 2010 055 797 A1 | 6/2012 | | |
| EP | 1 391 358 A2 | 2/2004 | | |
| WO | WO 97/27533 A1 | 7/1997 | | |

* cited by examiner

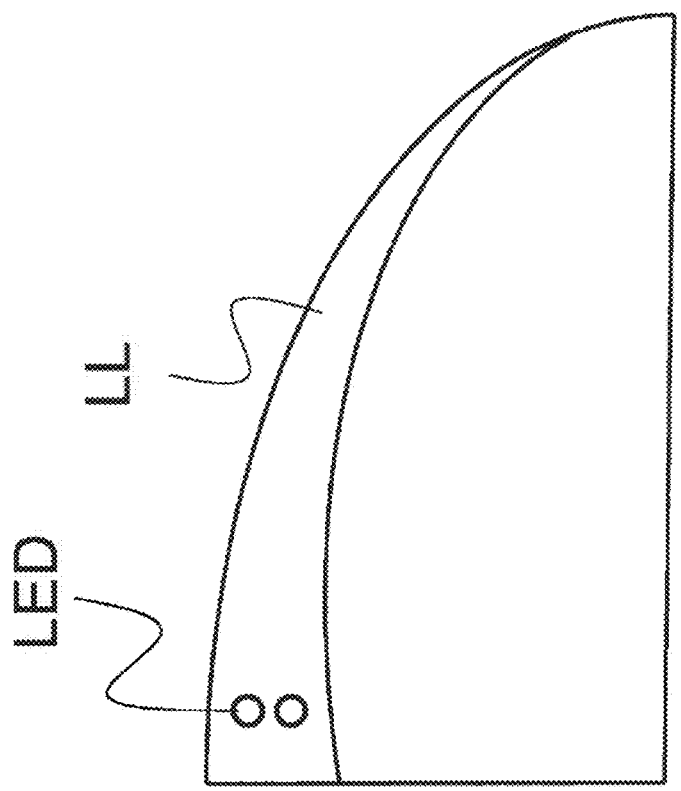
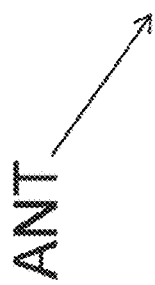
FIG 2

MOTOR VEHICLE HAVING A LAMP IN AN ANTENNA DEVICE FOR SIGNALING THE OPERATING CONDITION OF A SECURITY SYSTEM

CROSS REFERENCE TO RELATED APPLICATIONS

This application is a continuation of PCT International Application No. PCT/EP2013/072104, filed Oct. 23, 2013, which claims priority under 35 U.S.C. § 119 from German Patent Application No. 10 2012 219 404.5, filed Oct. 24, 2015, the entire disclosures of which are herein expressly incorporated by reference.

BACKGROUND AND SUMMARY OF THE INVENTION

The invention relates to a motor vehicle having a security system.

Motor vehicles having a security system (for example, an antitheft warning system and/or an immobilizer) have long been known. In this case, the operating state of the security system is often indicated using a lamp which is integrated into the interior rearview mirror. This type of indicating means for the operating state of the security system can generally be clearly seen only by an observer standing in front of the motor vehicle and is not suitable for combination with further indicators.

The invention is based on the object of specifying a motor vehicle by way of which the prior art is improved.

This and other objects are achieved by providing a motor vehicle having a security system, with a first lamp for indicating the operating state of the security system, and with an antenna device which is supported by the body of the motor vehicle and is arranged outside the vehicle body, wherein the first lamp is integrated into the antenna device.

The invention is accordingly also based on the idea of indicating the operating state of the security system (for example, an antitheft warning system and/or an immobilizer) of a motor vehicle by a lamp which is integrated into an external antenna of the motor vehicle. As a result, the indicating means can be designed such that it can be seen from all directions and can be easily combined with further indicators for which, for example, it is particularly important that they can also be seen by a user standing to the side of the motor vehicle or behind the motor vehicle.

A preferred motor vehicle therefore includes a security system, a first lamp for indicating the operating state of the security system, in particular of the security system controller, and an antenna device which is supported by the body of the motor vehicle and is arranged outside the vehicle body, wherein the first lamp is integrated into the antenna device, for example is in the form of part of the antenna device. By way of example, the antenna device and the first lamp at least partially share a housing, the antenna device and the first lamp are connected to the motor vehicle by way of the same fastening device or support device, or the first lamp is supported or held by the antenna device.

The antenna device has a housing and is preferably arranged on the motor vehicle roof. The antenna device preferably includes a mobile radio antenna and/or an antenna for receiving signals from a satellite-based navigation system.

As an alternative or in addition, the antenna device is preferably in the shape of a fin. As a result, aerodynamically expedient indication of the operating state of the security system, which indication can be seen from all directions, is possible using a first lamp which is integrated into the antenna device.

To this end, the first lamp preferably includes at least a light-emitting diode and a light guide, wherein light from the light-emitting diode is coupled into the light guide and is coupled out of the light guide along the light guide by suitable coupling-out elements. In this case, a top and/or a rear edge of the antenna device are/is preferably formed partially or substantially by the light guide, and/or the light which is coupled out through the light guide is coupled out substantially at the edge of the antenna device.

The antenna device is particularly preferably in the shape of a fin, the top edge of said fin running in the plane of symmetry of the motor vehicle. The light guide which emits the light from the first lamp preferably forms the top edge of the antenna device by being arranged on the housing of the antenna device, or being held or surrounded by a transparent part of the housing of the antenna device. As an alternative to this, the light guide can at least partially form the circumferential edge of the base of the antenna device and, in the process, for example be arranged almost directly on the motor vehicle roof.

Advantageously, the light guide is integrated into the antenna device in such a way that it is visible to an observer standing in front of the motor vehicle, to an observer standing behind the motor vehicle, and to an observer standing to the side of the motor vehicle.

According to a further design variant, a second lamp for indicating the operating state of the security system is provided, which second lamp is arranged in the interior of the motor vehicle and is coupled to the first lamp, in particular in that both the first lamp and the second lamp are actuated, in particular synchronously, or synchronized by the same security system controller. To this end, the first lamp is preferably connected to the second lamp by way of connecting lines.

The light intensity which is generated by the first lamp in the active state (lighted state or state of maximum light intensity generation) is preferably less than 0.5 candela, in particular less than 0.1 candela. In addition or as an alternative, the light intensity which is generated by the first lamp in the active state is greater than 0.01 candela. Comprehensive simulations on which the invention is based have shown that this selection ensures that the indicating means for the operating state of the security system firstly can be clearly seen by observers outside the motor vehicle and secondly does not have a disturbing or distracting effect on other road users.

According to an advantageous development, provision is made for the first lamp to be alternately switched to an active state and a passive state (off state or state of minimum light intensity generation) in the standby state of the security system, wherein the duration of the active state is in each case less than 0.1 second, and the duration of the passive state is between one second and two seconds. Comprehensive simulations on which the invention is based have shown that this selection ensures that firstly the indicating means for the operating state of the security system can be sufficiently clearly seen and secondly that an excessively high power consumption is not required. The last-mentioned point is particularly important in respect of the state of charge of the motor vehicle battery since the standby state of the security system is generally indicated when the engine is stationary, possibly over several days.

According to a further advantageous development, provision is made for the first lamp to be alternately switched to an active state and a passive state in the alarm state of the security system, wherein the duration of the active state is in each case between 0.1 second and one second, and the duration of the passive state is also in each case between 0.1 second and one second. Comprehensive simulations on which the invention is based have shown that this selection ensures that the indicating means for the alarm state of the security system can be seen particularly clearly but, nevertheless, does not require an excessively high current consumption since the alarm state generally has to be indicated only for a short time.

The first lamp is preferably designed in such a way that light of a different color can be emitted by the first lamp depending on the actuation of said first lamp. To this end, the first lamp particularly preferably includes a multicolored light-emitting diode, such as an RGB light-emitting diode for example, which is connected to the security system controller or to the charging controller, described in the text which follows, by means of several connecting lines.

A particular embodiment of the invention makes provision for the first lamp to be actuated depending on the operating state of the security system, in particular in such a way that the color of the light which is emitted by the first lamp and/or the duration of the active state and/or of the passive state of the first lamp depend/depends on the operating state of the security system.

Another development of the invention makes provision for the motor vehicle to have a charging device with an associated charging controller, in which the first lamp, in particular in combination with the above-mentioned dependencies on the operating state of the security system, is actuated depending on the operating state of the charging device, in particular in such a way that the color of the light which is emitted by the first lamp and/or the duration of the active state and/or of the passive state of the first lamp depend/depends on the operating state of the charging device.

As a result, it is possible to signal not only the operating state of the security system but also the operating state of the charging device with one lamp.

A further particularly advantageous embodiment of the invention makes provision for the first lamp to be actuated depending on the operating state of the charging device and depending on the operating state of the security system, in particular in such a way that the color of the light which is emitted by the first lamp depends on the operating state of the charging device, and the duration of the active state and/or of the passive state of the first lamp and/or of the second lamp depends on the operating state of the security system.

In this case, provision is particularly preferably made for the operating state of the security system to be indicated to the charging controller, and for the first lamp to be actuated by the charging controller (depending on the operating state of the security system and the operating state of the charging device), and to be actuated by the controller of the security system, in particular in an indirect manner.

A further particularly advantageous refinement of the invention makes provision for light of a first color to be generated by the first lamp in order to indicate the operating state of the security system (in respect of this first color, the duration of the active state and/or of the passive state of the first lamp depends on the operating state of the security system), and for light of at least one other color to be generated by the first lamp in order to indicate the operating state of the charging device (the selection of the at least one other color from a large number of possible colors and/or the duration of the active state and/or of the passive state of the first lamp in respect of this color depend(s) on the operating state of the charging device).

In this case, the operating state of the charging device and the operating state of the security system are preferably indicated in parallel by the first lamp in such a way that the light, in particular the light color, for indicating the operating state of the security system is generated and/or emitted by the first lamp with priority.

By way of example, the generation and emission of the light of the first color have priority over the generation and emission of the light of the at least one other color. If, therefore, the indicator for the state of the charging device and the indicator for the state of the security system provide at the same time an active state of the first lamp, but with light of different colors, the light with the color for indicating the state of the security system and, preferably, not the light with the color for indicating the state of the charging device, is emitted by the first lamp. As an alternative to this, provision may be made for the first color and the at least one other color to be mixed in this case.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a simplified schematic sectional illustration of an exemplary embodiments of an antenna device;

DETAILED DESCRIPTION OF THE DRAWINGS

Figure 1:
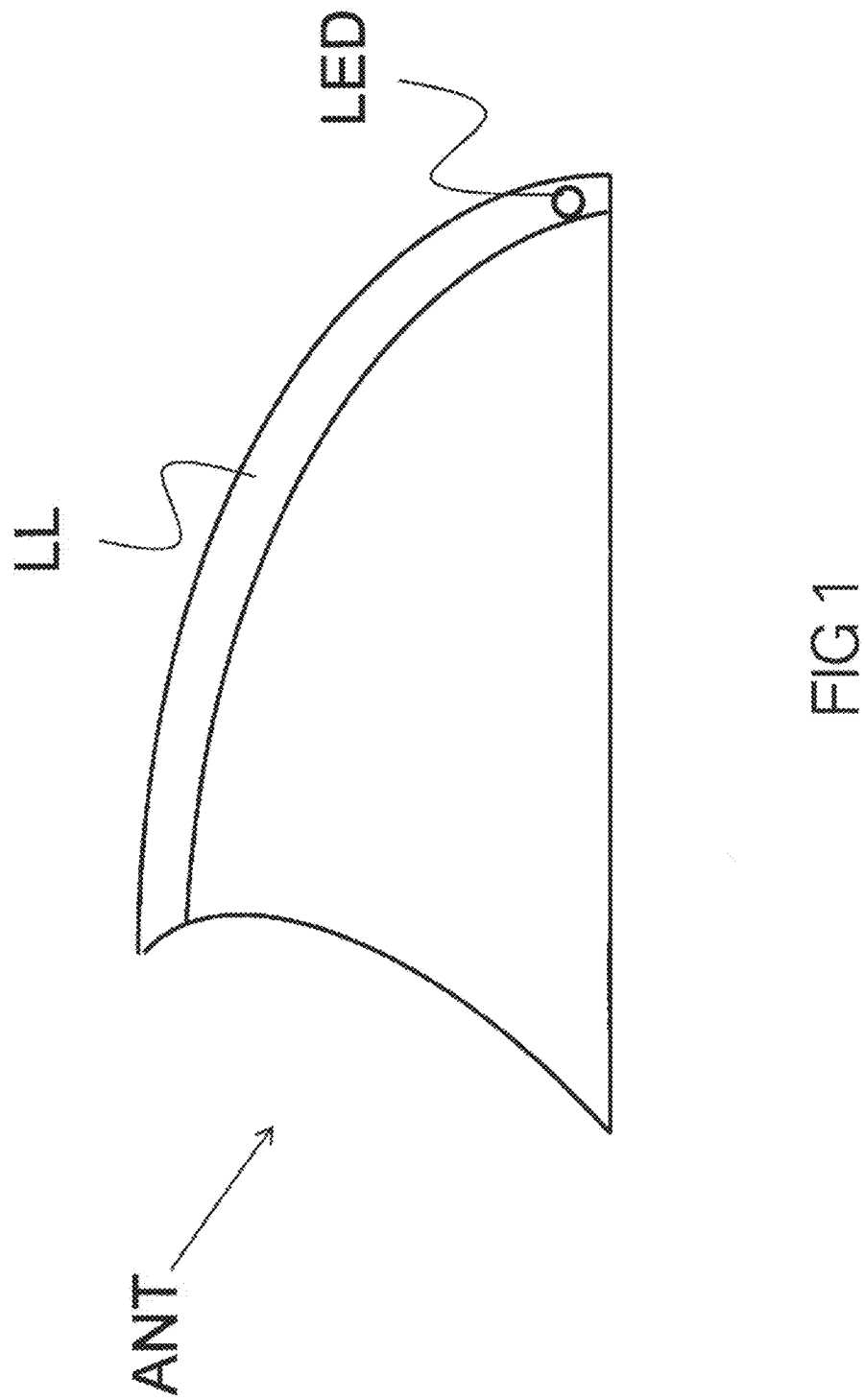
FIG. 1 is a simplified schematic sectional illustration of an exemplary embodiments of an antenna device.

FIG. 1 shows a sectional illustration of an antenna device ANT along the plane of symmetry of the antenna device ANT. The antenna device ANT is preferably arranged on a motor vehicle in such a way that the plane of symmetry of the antenna device ANT is identical to the plane of symmetry of the motor vehicle.

The top edge of the antenna device ANT is characterized by a light guide LL, which is arranged on the antenna device ANT or is held by the housing of the antenna device. Light from a light-emitting diode LED is coupled into the light guide LL in order to implement the indication operations according to the invention. The light-emitting diode LED is preferably an RGB light-emitting diode which is able to generate and emit light of different colors depending on the actuation of said light-emitting diode. The light-emitting diode LED is arranged, for example, next to the light guide LL or in a recess in the light guide LL. A first lamp is realized by the light-emitting diode LED and the light guide LL. A second lamp (not illustrated) can be realized, for example, by a lamp which is arranged in the motor vehicle.

FIG. 2 shows a sectional illustration of an alternative antenna device ANT along the plane of symmetry of the antenna device ANT. The antenna device ANT is again preferably arranged on a motor vehicle in such a way that the plane of symmetry of the antenna device ANT is identical to the plane of symmetry of the motor vehicle.

The top edge of the antenna device ANT of FIG. 2 is characterized by a light guide LL which is arranged on the antenna device ANT or is held by the housing of the antenna device in this variant too. In this case, light from two light-emitting diodes LED is coupled into the light guide LL in order to realize the first lamp in order to implement the indication operations according to the invention.

Figure 3:
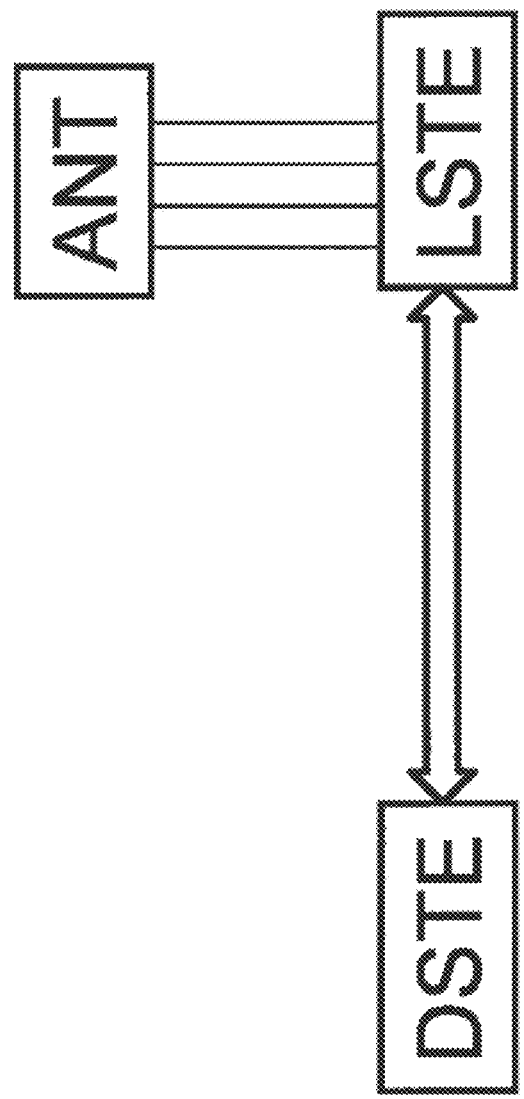
FIG. 3 is a simplified block diagram of one design variant of the invention.

FIG. 3 shows a simplified block diagram of a system comprising a security system, in particular an antitheft warning system, a charging device and an antenna device ANT, wherein the security system is represented by a security system controller DSTE and the charging device is represented by a charging controller LSTE in FIG. 3.

The operating state (alarm state or standby state) of the security system, in particular of the security system controller DSTE, is transmitted to the charging controller LSTE by way of a data connection, such as a data bus for example.

The antenna device ANT, in particular the first lamp which is integrated into the antenna device ANT, is then actuated by the charging controller LSTE, for example, by way of four connecting lines.

The first lamp is actuated depending on the operating state of the charging device (readiness for charging, charging, fully charged, fault, . . . ) and the operating state (alarm state or standby state) of the security system, in particular in such a way that the color, duration and/or intensity of the light which is generated by the first lamp and is coupled into the light guide depend/depends on the operating state of the charging device and the operating state of the security system.

One example of an operation for indicating the operating states of the charging device and the security system will be explained below using FIG. 4.

Figure 4:
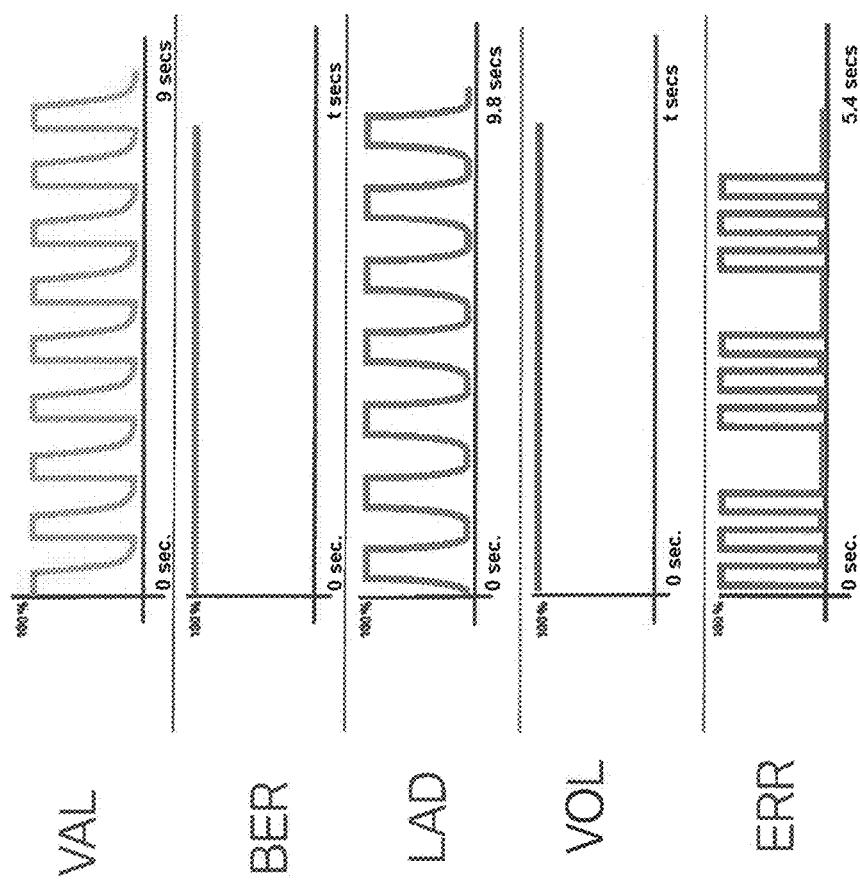
FIG. 4 illustrates graphically various signal profiles.

FIG. 4 illustrates five alternative indicating profiles for five different operating states of the charging device, said indicating profiles being generated by corresponding actuation of the first lamp by the charging controller LSTE. Time is illustrated on the abscissa and the intensity of a selected light color is indicated on the ordinate.

The first indicating profile relates to the color orange and is generated in the validation operating state VAL in which the charging device is checked.

The second indicating profile relates to the color blue and is generated in the standby operating state BER of the charging device.

The third indicating profile relates to the color blue and is generated in the charging operating state LAD of the charging device.

The fourth indicating profile relates to the color green and is generated in the fully charged operating state VOL of the charging device.

The fifth indicating profile relates to the color red and is generated in the fault operating state ERR of the charging device.

The various colors and indicating profiles are created by corresponding actuation of the first lamp, in particular the RGB light-emitting diode. It goes without saying that the colors red, blue and orange can be replaced by other colors within the scope of the invention.

In addition to the operating state of the charging device, the operating state of the security system is also indicated by the first lamp. The operating state of the security system is indicated, for example, by the color red.

The indicating profile for indicating the standby state of the security system is, for example, characterized by alternating switching over between an active state (lighted state or state of maximum light intensity generation) and a passive state (off state or state of minimum light intensity generation), wherein the duration of the active state is in each case less than 0.1 second and the duration of the passive state is between one second and two seconds.

The indicating profile for indicating the alarm state of the security system is, for example, likewise characterized by alternating switching over between the active state and a passive state, wherein the duration of the active state is in each case between 0.1 second and one second and the duration of the passive state is also in each case between 0.1 second and one second.

Since the operating state of the charging device and the operating state of the security system are implemented with the same first lamp, in particular the same RGB light-emitting diode, provision is made for the indicating profile which relates to the security system to have priority during times at which both the indicating profile which relates to the security system and the indicating profile which relates to the charging device provide an active state of the first lamp, in particular the RGB light-emitting diode. During these times, the indicating profile which relates to the charging device is accordingly interrupted or suppressed until the indicating profile which relates to the security system again provides a passive state of the first lamp, in particular the RGB light-emitting diode.

A preferred design variant makes provision for the security system to include, in addition or as an alternative to the antitheft warning system, an immobilizer, wherein the standby mode of the immobilizer is indicated by the first lamp by the generation of blue light, and the manipulation state of the immobilizer is indicated by the first lamp by the generation of red light.

Provision is preferably again made for the indicating profile which relates to the security system to have priority during times at which both the indicating profile which relates to the security system and the indicating profile which relates to the charging device provide an active state of the first lamp, in particular the RGB light-emitting diode, in this design variant too.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a security system of the motor vehicle, the security system being a vehicle immobilizer and having two operating states, an alarm state and a standby state;
   a first lamp configured to indicate an operating state of the security system of the motor vehicle; and
   an antenna supported by a body of the motor vehicle, the antenna being arranged on an exterior of the body, wherein
   the first lamp for indicating the operating state of the security system is integrated into the antenna arranged on the exterior of the body of the motor vehicle,
   the first lamp is alternately switched to an active state and to a passive state while the security system is in the standby state, and
   the standby state of the security system is indicated when an engine of the motor vehicle is stationary.

2. The motor vehicle according to claim 1, wherein the antenna is arranged on a motor vehicle roof.

3. The motor vehicle according to claim 1, wherein the antenna comprises a mobile radio antenna.

4. The motor vehicle according to claim 1, wherein the antenna has a fin-shape.

5. The motor vehicle according to claim 1, wherein the first lamp comprises a light-emitting diode and a light guide, wherein light from the light-emitting diode is coupled into the light guide.

6. The motor vehicle according to claim 5, wherein a top and/or a rear edge of the antenna is formed substantially by the light guide.

7. The motor vehicle according to claim 5, wherein the light guide is visible to an observer standing in front of the motor vehicle, to an observer standing behind the motor vehicle, and to an observer standing to the side of the motor vehicle.

8. The motor vehicle according to claim 1, further comprising:
a second lamp for indicating the operating state of the security system, wherein the second lamp is arranged in an interior of the motor vehicle and is coupled to the first lamp.

9. The motor vehicle according to claim 1, wherein light intensity which is generated by the first lamp is less than 0.5 candela.

10. The motor vehicle according to claim 1, wherein light intensity which is generated by the first lamp is less than 0.1 candela.

11. The motor vehicle according to claim 1, wherein light intensity which is generated by the first lamp is greater than 0.01 candela.

12. The motor vehicle according to claim 1, wherein a duration of the active state is in each case less than 0.1 second, and a duration of the passive state is between one second and two seconds.

13. The motor vehicle according to claim 1, wherein:
the first lamp is alternately switched to the active state and the passive state while the security system is in the alarm state, and
a duration of the active state is in each case between 0.1 second and one second, and a duration of the passive state is in each case between 0.1 second and one second.

14. The motor vehicle according to claim 1, wherein the first lamp is configured such that light of a different color is emittable by the first lamp depending on an actuation of the first lamp.

15. The motor vehicle according to claim 1, further comprising: a charging device with an associated charging controller, wherein
the first lamp is actuated depending on an operating state of the charging device such that a color of the light which is emitted by the first lamp depends on the operating state of the charging device.

16. The motor vehicle according to claim 15, wherein the operating state of the charging device and the operating state of the security system are indicated in parallel by the first lamp, and a light color for indicating the operating state of the security system is generated and/or emitted by the first lamp with priority.

17. The motor vehicle according to claim 16, wherein the operating state of the security system is indicated to the charging controller, and the first lamp is actuated by the charging controller.

18. The motor vehicle according to claim 17, wherein light of a first color is generated by the first lamp in order to indicate the operating state of the security system, and light of at least one other color is generated in order to indicate the operating state of the charging device.

19. The motor vehicle according to claim 1, wherein the first lamp is actuated depending on an operating state of the security system such that a color of the light which is emitted by the first lamp and/or a duration of the active state and/or of the passive state of the first lamp depends on the operating state of the security system.

20. The motor vehicle according to claim 1, further comprising:
a charging device with an associated charging controller, wherein
the first lamp is actuated depending on the operating state of the charging device such that a duration of the active state and/or of the passive state of the first lamp depends on the operating state of the charging device.

* * * * *